United States Patent

Farmer

[15] 3,647,004
[45] Mar. 7, 1972

[54] VERTICALLY AND LATERALLY ADJUSTABLE PLOW STANDARD

[72] Inventor: Robert Leslie Edward Farmer, Yorkshire, England

[73] Assignee: R. L. Farmer Limited, Yorkshire, England

[22] Filed: June 12, 1969

[21] Appl. No.: 832,594

[30] Foreign Application Priority Data

June 18, 1968 Great Britain......................28,849/68

[52] U.S. Cl..............................172/152, 172/254, 172/661, 172/741, 172/744, 172/760
[51] Int. Cl...............A01b 49/02, A01b 15/12, A01b 65/02, A01b 65/06
[58] Field of Search..................172/139, 140, 174, 195, 201, 172/254, 382, 661, 668, 744, 753, 762, 763, 773, 500; 248/407, 408, 423; 287/58 LT, 58; 306/1.5, 1.6

[56] References Cited

UNITED STATES PATENTS

| 39,537 | 8/1863 | Yost | 172/254 |
|---|---|---|---|
| 1,314,038 | 8/1919 | Atkins | 172/500 |
| 1,721,462 | 7/1929 | Metz | 172/382 |
| 1,830,013 | 11/1931 | Bohmker | 172/254 |
| 2,654,198 | 10/1953 | Ryan | 287/58 |
| 2,662,712 | 12/1953 | Rose | 248/408 |
| 3,097,550 | 7/1963 | Johnston | 287/58 R |
| 3,141,508 | 7/1964 | McMullen et al. | 172/744 |
| 3,356,395 | 12/1967 | Dygert et al. | 287/20.924 |
| 3,394,765 | 7/1968 | Davis | 172/753 |
| 3,519,086 | 7/1970 | Padgett | 172/744 |

FOREIGN PATENTS OR APPLICATIONS 819,595  11/1951  Germany..............................306/1.5

Primary Examiner—Robert E. Bagwill
Assistant Examiner—C. W. Hanor
Attorney—Whittemore, Hulbert & Belknap

[57] ABSTRACT

A plough for use on weed-infested land comprising a semimounted frame, at least one "full-digger" share and at least one "semidigger" share located at different vertical levels in positions that are spaced apart lengthwise of the frame. Means are provided for both coarse and fine vertical adjustments of the shares.

8 Claims, 5 Drawing Figures

PATENTED MAR 7 1972
3,647,004
SHEET 1 OF 2
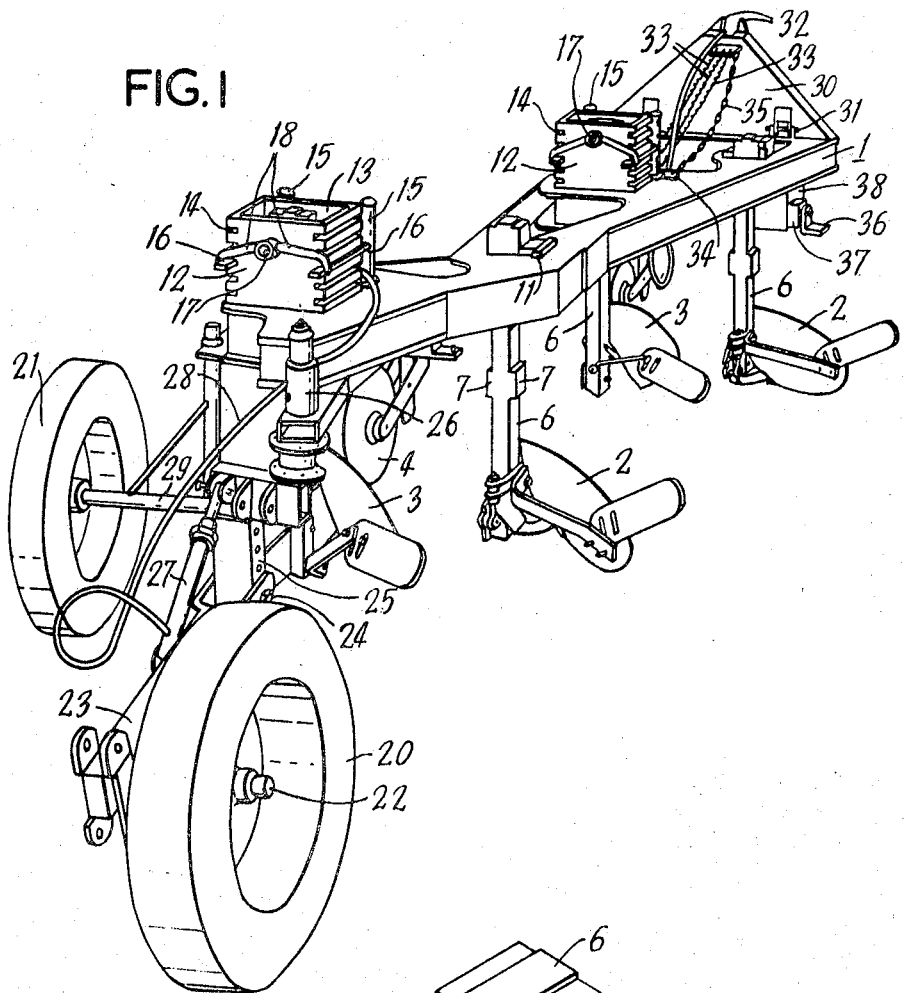
FIG.I
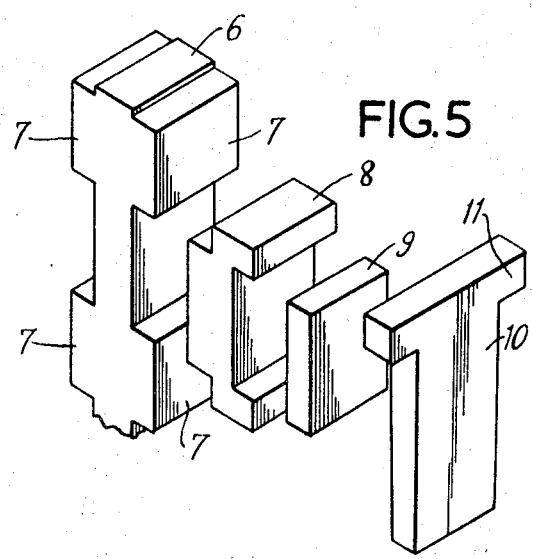
FIG.5
INVENTER
ROBERT LESLIE EDWARD FARMER
BY Whittemore,
Hulbert & Belknap
ATTORNEYS

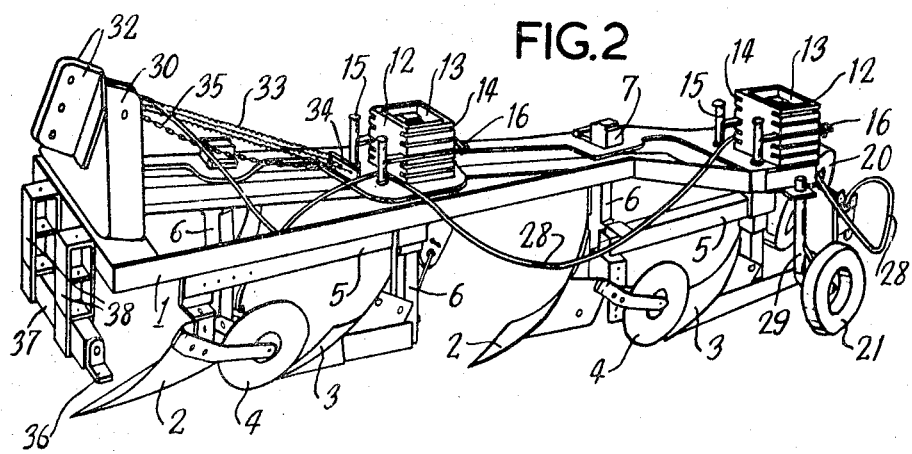
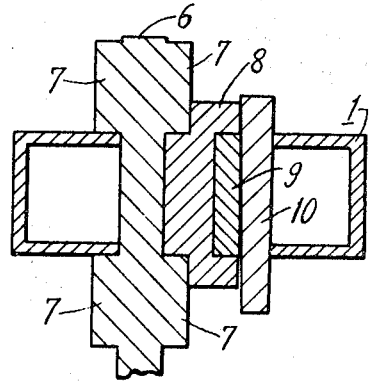
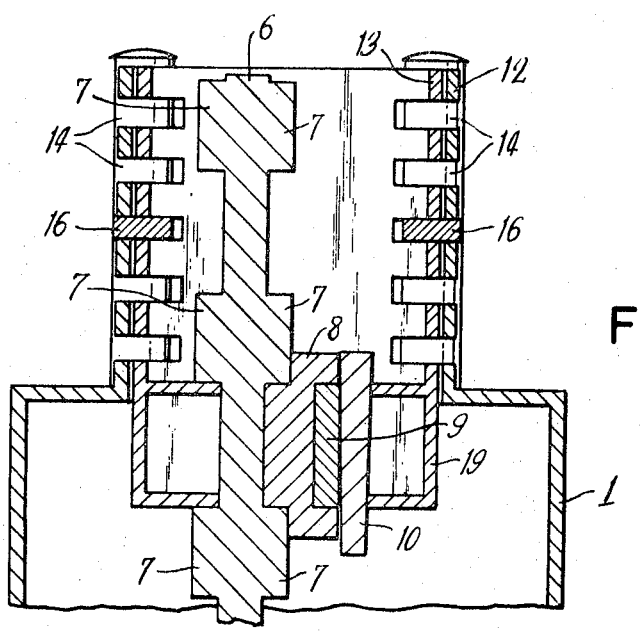
INVENTOR
ROBERT LESLIE EDWARD FARMER
ATTORNEYS

VERTICALLY AND LATERALLY ADJUSTABLE PLOW STANDARD

This invention relates to ploughing and one of its objects is the provision of a plough which can be operated in such a manner as to achieve the burial of weeds and other unwanted vegetation to a depth such that inhibition of new shoot growth of the unwanted vegetation results followed by decay of such vegetation which will enrich the soil structure by augmenting the humus content thereof. Although a plough in accordance with the invention is suitable for dealing with weed infestations of a large variety of kinds, it is perennial jointed-rhizome grasses that present by far the most serious problem that is intended to be solved, or at least greatly reduced, by the use of a plough in accordance with the invention. Even moderate infestations of Agropyron repens, Agrostis gigantea or Agrostis stolonifera can result in depressions of crop yield by up to 10 percent. Moreover, the combine harvesting of infested cereal crops is often seriously delayed and made much more difficult than would be the case with land that was infested to only a very small extent, or not at all.

According to the invention there is provided a plough comprising a frame and at least two shares or plough bodies each of which is arranged to displace soil laterally with respect to the intended direction of operative travel of the plough, wherein one of said shares or plough bodies is arranged so that it can be located at a different vertical level relative to the other and is spaced therefrom lengthwise of the frame, there being means provided for adjusting the levels of the two shares or plough bodies relative to said frame.

In the use of a plough in accordance with the invention, a strip of surface soil, together with the weeds or other vegetation contained therein can be displaced by the upper share or plough body into the bottom of a deep furrow ploughed by the lower share or plough body, the soil displaced from the bottom of the deep furrow by the lower share or plough body being deposited on top of the upper soil and weeds lying at the bottom of a deep furrow cut during the previous traverse of the plough, or cut by a neighboring lower share or plough body in the case of a plough having two or more pairs of upper and lower shares or plough bodies.

For a better understanding of the invention, and to show how the same may be carried into effect, reference will now be made, by way of example, to the accompanying drawings, in which:

FIG. 1 is a perspective view of the rear and one side of a plough in accordance with the invention, FIG. 2 is a perspective view, to a slightly reduced scale, of the front and opposite side of the plough of FIG. 1, FIG. 3 is a sectional elevation, to an enlarged scale, showing the means by which the upper shares or plough bodies can be adjusted in position both vertically and laterally, FIG. 4 is a sectional elevation to the same scale as FIG. 3 showing the means by which the lower plough bodies or shares can be adjusted in position both vertically and laterally, and FIG. 5 is an exploded perspective view of the means illustrated in FIG. 4.

Referring to the drawings, the plough which is illustrated has a generally horizontally disposed frame that is indicated by the reference 1. Two pairs of shares or plough bodies are adjustably connected to the frame 1, there being two lower shares 2 and two upper shares 3. Each lower share 2 is of the so-called "full-digger" type, which leaves no appreciable plough seam, while each upper share 3 is of the so-called "-semi-digger" type which forms an unbroken furrow that is turned completely over at a depth just below the root growth of unwanted weeds and other vegetation, generally speaking a depth of approximately 7 inches (approximately 175 millimeters). It will be noted that the lower share 2 of each pair precedes the upper share 3 thereof in the intended direction of operative travel of the plough (which is from right to left as seen in FIG. 2 of the drawings) and that the two shares 2 and 3 of each pair are offset relative to one another in a horizontal direction that is perpendicular to the direction of travel which has just been mentioned. Rotary coulter discs 4 immediately precede the two upper shares 3 to define the strips of land which are to be ploughed thereby, said coulter discs 4 being adjustably mounted at the leading ends of arms 5 whose rearmost ends are clamped to the mountings of the upper shares 3, these mountings being further described hereinafter.

All four of the shares 2 and 3 are secured to the lowermost ends of mountings in the form of vertical posts 6 upper regions of which carry three pairs of projections 7 (FIGS. 3 to 5), the two projections 7 of each pair being located at relatively opposite sides of the corresponding post 6 and the three pairs being spaced apart from one another down the corresponding post 6 in such a way that the central pair of projections 7 is located midway between the uppermost and lowermost pairs thereof. It will be seen from FIGS. 3, 4 and 5 of the drawings that the means for coarse vertical adjustment of the posts 6 relative to the frame 1 are the same in respect of both the posts 6 corresponding to the lower shares 2 and the posts 6 corresponding to the upper shares 3. Referring firstly to FIGS. 4 and 5 of the drawings, it can be seen that the frame 1 has a hollow rectangular configuration and that its horizontal upper and lower horizontal parts are formed with holes through which the posts 6 corresponding to the lower shares 2 can be entered. The vertical distance between the upper and lower horizontal parts of the frame 1 is the same as the vertical spacing between neighboring pairs of projections 7 and therefore, as can be seen best in FIG. 4 of the drawings, a post 6 can be entered through the frame 1 and can be reliably and rigidly retained in its chosen position by using a profiled block 8, a plain block 9 and a wedge 10. The profiled block 8 includes a projection that fits the recesses that are effectively formed between neighboring projections 7 and also, on its opposite side, a recess in which the plain block 9 fits. The wedge 10 is slightly tapered in a downward direction and is provided with ears 11 (FIG. 5) that prevent it from being driven too far downwardly into the upper hole in the frame 1. It will be evident from the drawings that each post can be moved laterally relative to the frame 1 merely by removing the corresponding blocks 8 and 9 and wedge 10 and replacing them at the opposite side of the post 6 in question thus effectively reversing the left to right order of the post 6, profiled block 8, plain block 9 and wedge 10 as seen in FIGS. 4 and 5 of the drawings.

Turning now to FIG. 3 of the drawings, two outer boxes 12 of rectangular configuration are rigidly secured to the frame 1 and two inner boxes 13 of similar configuration but slightly smaller size are located internally of the corresponding boxes 12 so as to be movable upwardly and downwardly therethrough. The lateral sides of both the outer and inner boxes 12 and 13 are formed with vertically spaced-apart horizontal slots 14 different ones of which can be brought into horizontal alignment by moving the inner boxes 13 upwardly or downwardly relative to the outer boxes 12. Two upright pivot pins 15 are mounted on the frame 1 immediately in front of each outer box 12, each pin 15 having a corresponding horizontal arm 16 mounted on it in such a way that the arms 16 can be turned about the pins 15 into positions in which they are entered through the central slot 14 in the neighboring side of the outer box 12 and through any slot 14 of the inner box 13 that happens to be in register with the central slot 14 that has just been mentioned. The other slots 14 in the outer boxes 12 can also be used by moving the arms 16 upwardly and downwardly along the pins 15.

The rearmost side of each outer box 12 carries a horizontal pivot 17 about which a pair of hooking arms 18 are turnable, said hooking arms 18 being used in engaging the ends of the arms 16 that are remote from the upright pivot pins 15 to retain those arms 16 in their operative positions. FIG. 3 shows that the bottom of each inner box 13 is provided with a downward unslotted extension 19 which has the same formation as the portion of the frame 1 that can be seen in FIG. 4. Thus, a post 6 corresponding to one of the upper shares 3 is connected to the downward extension 19 of the corresponding inner box 13 by a profiled block 8, plain block 9 and wedge 10 identical to those that have previously been described. A coarse vertical adjustment of the position of the post 6 relative to the frame 1 can thus be made with the aid of the blocks 8 and 9 and wedge 10 while a fine vertical adjustment of said position is effected by withdrawing the arms 16 from the slots 14 and moving the inner box 13 upwardly or downwardly relative to the outer box 12 until the desired setting is attained. The arms 16 are then replaced in their operative positions and are retained in those positions by the hooking arms 18.

The frame 1 may be formed from rolled steel sections and steel plate that are welded together and two ground wheels 20 and 21 are provided at the rearmost end of said frame with respect to the intended direction of operative travel of the plough. The ground wheel 20 is a trailing castor wheel whose axle 22 is mounted on an arm 23 that projects rearwardly from a horizontal pivot 24 by which said arm is adjustably connected to an upright member 25. The upright member 25 is connected to the frame 1 by way of a vertical pivot 26 that affords the castoring axis of the wheel 20. A single-acting hydraulic piston and cylinder assembly 27 extends between the arm 23 and the upright member 25 in such a way that, upon extension of the piston rod of said assembly, the arm 23 and the wheel 20 that is carried thereby will be turned downwardly about the horizontal pivot 24 relative to the upright member 25 and frame 1. A flexible hydraulic duct 28 extends from the cylinder of the assembly 27 to the front of the plough at which point it is provided with a releasable leak-proof connection (not shown) for coupling the duct to the hydraulic system of an agricultural tractor or other vehicle which tows the plough during the use thereof. In order to enable the lateral position of the wheel 20 to be adjusted, it is preferably mounted on its axle 22 with the aid of one or more bushes (not visible in the drawings) that can be moved from one side of the wheel to the other. Moreover, the axle 22 about which the wheel 20 is rotatable can be positioned at either side of the arm 23.

The ground wheel 21 is slightly smaller than the ground wheel 20 and is rotatably connected to the rear end of the frame 1 by a bracket 29 in such a way that it lies to the left-hand side of the frame 1 relative to the intended direction of operative travel of the plough. The ground wheel 21 increases the stability of the plough during operation but, when the piston of the assembly 27 is extended to raise the shares 2 and 3 clear of the ground for transport purposes, the wheel 21 is also raised clear of contact with the ground.

The leading end of the frame 1 of the plough is provided with a headstock 30 that is releasably connected to said frame by aligned horizontal pivots 31, the front of the headstock 30 carrying a pair of vertical plates 32 formed with three vertically spaced pairs of horizontally aligned holes which can be connected to the free end of the upper adjustable lifting link of a hydraulically operated three-point lifting device or hitch of an agricultural tractor or other vehicle by means of a horizontal pivot pin. An assembly of three helical tension springs 33 extends between the top of the headstock 30 and an anchorage 34 on the frame 1 to assist in enabling the plough automatically to adjust its attitude over uneven ground and maintain the correct depth of ploughing. A check chain 35 also interconnects the headstock 30 and the anchorage 34 to prevent excess movement about the pivots 31 against the restraining action of the springs 33. Lower horizontal connecting pins 36 are provided for coupling to the free ends of the lower lifting links of a hydraulically operated three-point lifting device or hitch, said lower pins 36 being located at the opposite ends of a crossbar 37 mounted so as to be movable laterally of the frame 1 in any one of three pairs of vertically spaced box guides 38. The vertical and lateral adjustments of the lower connecting pins 36 which are thus available enable the plough to be used readily with hydraulic lifting and draft gear of a number of different constructions and enable the position of the plough to be adjusted readily for the correct line of draft when connected to a tractor or other vehicle.

In the use of the plough which has been described, the plates 32 and pins 36 are connected to the hydraulically operated three-point lifting device or hitch of a towing agricultural tractor or other vehicle and the leading end of the flexible duct 28 is connected to the same hydraulic system in such a way that raising the links of the lifting device will cause extension of the piston rod of the piston and cylinder assembly 27 with the result that the rear end of the frame 1 will be raised vertically at the same time as the leading end thereof. When the various shares or plough bodies 2 and 3 are disposed in the general manner shown in FIGS. 1 and 2 of the drawings, said shares 2 and 3 of each pair are spaced both laterally of the frame 1 and longitudinally with respect to the intended directions of operative travel of the plough. Under these circumstances, the strip of lower soil which is exposed when the rearmost upper share 3 laterally displaces the overlying and weed-containing upper soil serves as a guide for the leading lower share 2 during the succeeding traverse of the plough, said leading lower share 2 displacing the weed-containing upper soil into the bottom of the furrow which it cuts. It will be evident that the range of adjustment of the shares 2 and 3 is such that, if desired, the two shares 2 and 3 of each pair may be interchanged so that the upper shares 3 precede the lower shares. Under these circumstances, the blocks 8 and 9 and the wedges 10 are positioned to reduce the lateral spacing between the two shares of each pair to a minimum and the ploughman himself has to attain the correct spacing of the furrows without the guidance which is available when the plough is arranged generally as shown in the drawings.

A plough in accordance with the invention has what may be considered as a double digging action and one ploughing operation therewith will accomplish the same effect as two or three ploughing operations with conventional ploughs. When four shares are provided, a minimum draft of about 50 horsepower is required but it is emphasized that a plough with a single pair of upper and lower shares and ploughs with three or more pairs of upper and lower shares are also within the scope of the invention. Generally speaking, the draft requirements are somewhat lower when the plough is arranged as shown in the drawings rather than with the upper shares 3 preceding the lower shares 2 as the weight of soil on each plough share is reduced under these circumstances. When required, the plough can be used in a conventional manner merely by removing the third share 2 and setting the remaining three shares at the same relatively shallow ploughing depth level.

I claim:

1. A plough comprising a frame; at least two shares each of which is mounted at the lowermost end of a post and is arranged to displace soil laterally with respect to the intended direction of travel of the plough and wherein at least one of said shares is arranged so that it can be located at a different vertical level relative to the other and is spaced therefrom lengthwise of the frame; means for coarse vertical and lateral adjustment of at least one of the shares relative to the frame comprising apertures defined by the frame, a series of pairs of vertically spaced-apart projections on the post, the two projections of each pair being located at opposite sides of the post, said post removably inserted into said aperture to engage the frame when disposed in said aperture by means of the projections on one side of the post, and a pair of shaped blocks and a wedge inserted between the projections on the other side of the post and the frame to preclude lateral movement of the post in said aperture and to retain said post in a corresponding vertical or lateral setting relative to the frame; and means for fine vertical adjustment of at least one of said shares.

2. A plough as claimed in claim 1, wherein the first block is plain, wherein the second block is profiled and has on one side thereof a projection shaped to fit between the projections on the same side of the post and on its opposite side is also shaped to define a recess in which the plain block fits, and wherein the wedge has two plain faces such that it fits into the space defined by the frame and the blocks in a manner wherein one of said faces is adjacent the frame and the other of said faces is adjacent the shaped blocks thereby preventing lateral movement of the post.

3. A plough as claimed in claim 1, wherein the means for fine vertical adjustment of the posts relative to the frame comprise inner boxes, to which said posts are adjustably secured, said inner boxes being of rectangular configuration with the lateral sides thereof formed with a series of vertically spaced-apart horizontal slots that are located internally of and are vertically slidable through corresponding outer boxes fastened to the frame, said outer boxes being of rectangular configuration and slightly larger size than said inner boxes with the lateral sides thereof formed with a series of vertically spaced-apart horizontal slots, and a pair of horizontally extending retaining members for adjustable retaining relationship with said series of slots that can be brought into register to receive said retaining members.

4. A plough as claimed in claim 3, wherein said posts are adjustably secured to the inner boxes by means of the projections on the one side of the post engaging the inner box and a plain block, a profiled block having on one side thereof a projection shaped to fit between the projections on one side of the post and on its opposite side having a recess in which the plain block fits, and a wedge having two plain faces adapted to fit between the blocks and one side of the inner box.

5. A plough comprising a frame, at least two posts, and at least two shares each of which is mounted at the lowermost end of a post and is arranged to displace soil laterally with respect to the intended direction of travel of the plough, at least one of said shares being of the full-digger type and at least one of said shares being of the semidigger type, at least one of said shares being arranged so that it can be located at a different vertical level relative to the other and being spaced therefrom lengthwise of the frame, and means for coarse vertical, fine vertical, and lateral adjustment of at least one post relative to said frame to correspondingly adjust the attached share, the means for coarse vertical and lateral adjustment of said post relative to said frame comprising apertures defined by the frame, a series of pairs of vertically spaced-apart projections on the post, the two projections of each pair located on opposite sides of the post, said post removably inserted into said aperture and engaging the frame when disposed in said aperture by means of the projections on one side of the post, and a pair of shaped blocks and a wedge inserted between the projections on the other side of the post and the frame to preclude lateral movement of the post in said aperture and to retain said post in a corresponding vertical or lateral setting relative to said frame.

6. A plough as claimed in claim 5, wherein the first block is plain, wherein the second block is profiled and has on one side thereof a projection shaped to fit between the projections on the same side of the post and on its opposite side is also shaped to define a recess in which the plain block fits, and wherein the wedge has two plain faces such that it fits into the space defined by the frame and the blocks in a manner wherein one of said faces is adjacent the frame and the other of said faces is adjacent the shaped blocks thereby preventing lateral movement of the post.

7. A plough as claimed in claim 5, wherein the means for fine vertical adjustment of the posts relative to the frame comprise inner boxes, to which said posts are adjustably secured, said inner boxes being of rectangular configuration with the lateral sides thereof formed with a series of vertically spaced-apart horizontal slots that are located internally of and are vertically slidable through corresponding outer boxes fastened to the frame, said outer boxes being of rectangular configuration and slightly larger size than said inner boxes with the lateral sides thereof formed with a series of vertically spaced-apart horizontal slots, and a pair of horizontally extending retaining members for adjustable retaining relationship with said series of slots that can be brought into register to receive said retaining members.

8. A plough as claimed in claim 7, wherein said posts are adjustably secured to the inner boxes by means of the projections on the one side of the post engaging the inner box and a plain block, a profiled block having on one side thereof a projection shaped to fit between the projections on one side of the post and on its opposite side having a recess in which the plain block fits, and a wedge having two plain faces adapted to fit between the blocks and one side of the inner box.

* * * * *